Feb. 4, 1947. G. E. DATH 2,415,162

FRICTION SHOCK ABSORBER

Filed Nov. 25, 1943 2 Sheets-Sheet 1

Inventor
George E. Dath
By Henry Fuchs
Atty.

Patented Feb. 4, 1947

2,415,162

UNITED STATES PATENT OFFICE 2,415,162

FRICTION SHOCK ABSORBER

George E. Dath, Chicago, Ill., assignor to W. H. Miner, Inc., Chicago, Ill., a corporation of Delaware Application November 25, 1943, Serial No. 511,714

5 Claims. (Cl. 267—9)

This invention relates to improvements in friction shock absorbers, especially adapted for use in connection with truck springs of railway cars, for snubbing or dampening the action of the springs.

One object of the invention is to provide a friction shock absorber which is substituted for one or more of the spring units of a cluster of truck springs of a railway car to dampen the action of the springs, comprising a friction post, and a pair of friction shoe members having sliding engagement with the post, wherein relative movement of the post and shoes is yieldingly resisted by spring means which also serves to press the shoes and post into tight frictional engagement with each other.

A further object of the invention is to provide a shock absorber of the character hereinbefore set forth wherein the friction post is provided with a spring follower plate section from which it projects, and the friction shoes embrace opposite sides of the friction post and are provided with laterally projecting base flanges, and the spring means surrounds the post and shoes and bears at opposite ends on the follower plate section of the post and the base flanges of the shoes to opposite relative movement of the post and shoes in lengthwise direction and press the shoes against the post.

A more specific object of the invention is to provide a shock absorber as set forth in the preceding paragraph, wherein the pair of friction shoes have their base portions interfitting and wherein the two shoes are counterparts of each other, thus making possible the use of a single shoe pattern and greatly reducing the cost of manufacture.

Other objects of the invention will more clearly appear from the description and claims hereinafter following.

Figure 1:
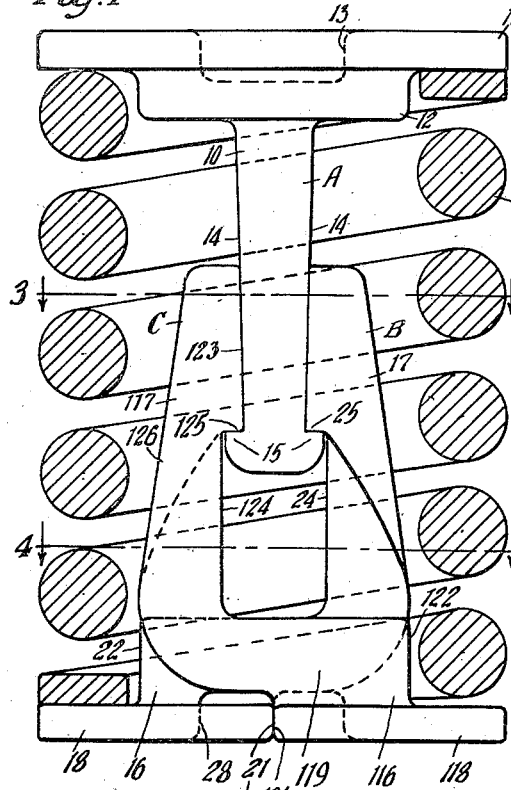
Figure 2:
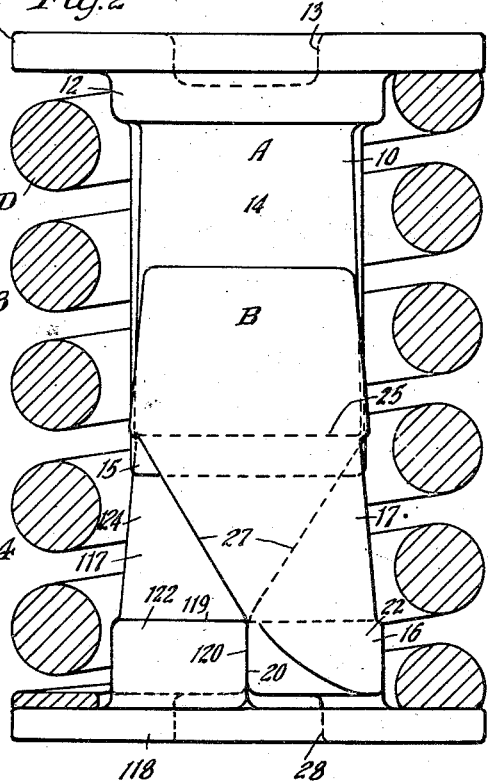
Figure 3:
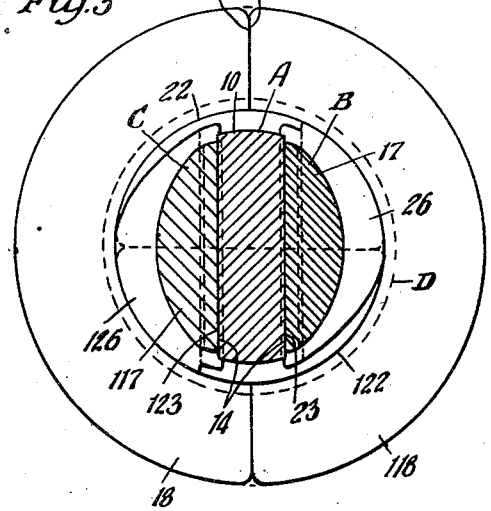
Figure 4:
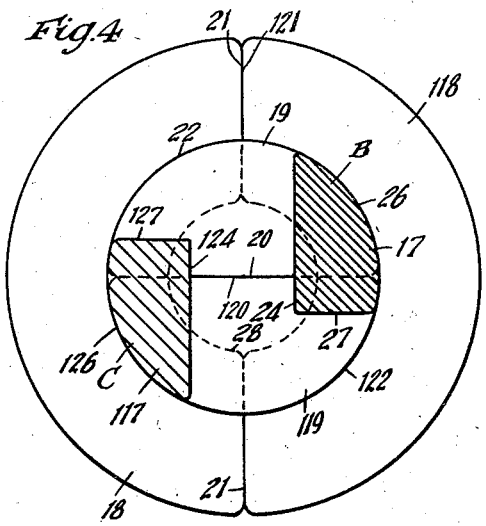
Figure 5:
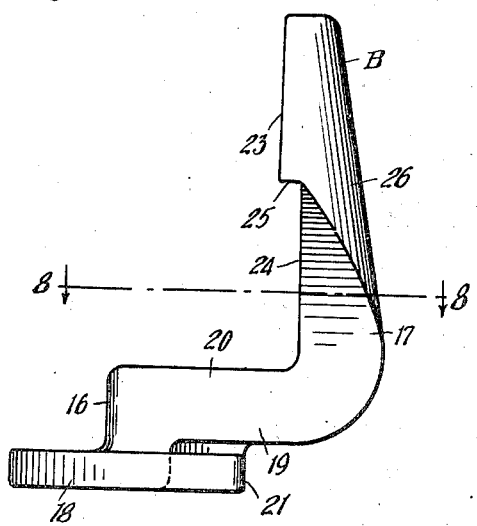
Figure 6:
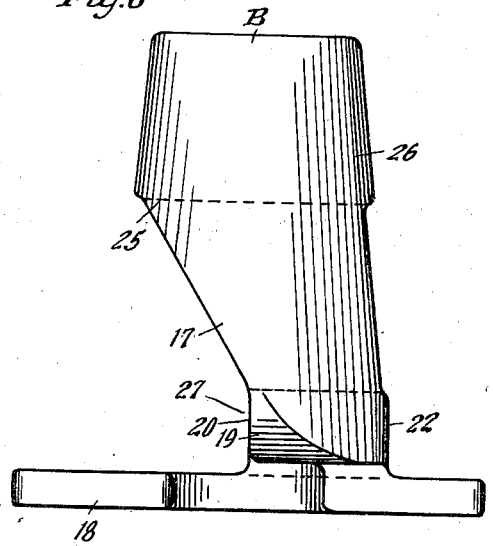
Figure 7:
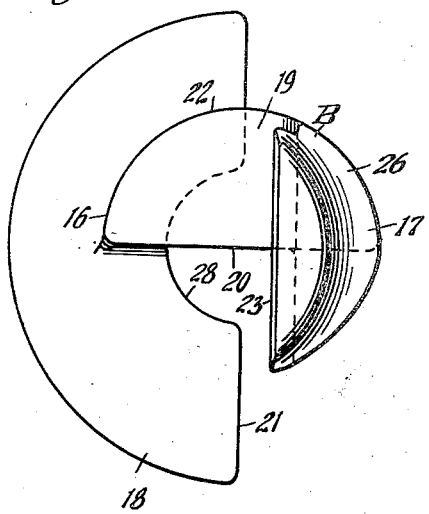
Figure 8:
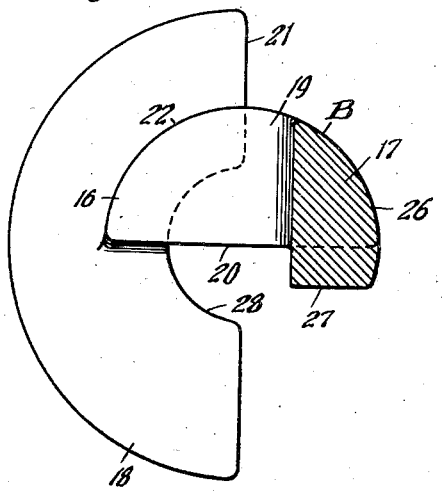

In the drawings forming a part of this specification, Figure 1 is an elevational view of my improved shock absorber, the spring member of the same being shown in vertical section. Figure 2 is a side elevational view of Figure 1, looking from right to left in said figure, the spring being shown in vertical section. Figures 3 and 4 are transverse horizontal section views, corresponding respectively to the lines 3—3 and 4—4 of Figure 1. Figure 5 is an elevational view of one of the friction shoes of the shock absorber, showing the shoe at the right hand side of the mechanism, as seen in Figure 1. Figure 6 is a side elevational view of Figure 5, looking from right to left in said figure. Figure 7 is a top plan view of Figure 5. Figure 8 is a transverse horizontal sectional view, corresponding substantially to the line 8—8 of Figure 5.

As shown in the drawings, my improved shock absorber comprises broadly a friction post A; two friction shoes B and C; and a spring resistance D.

The friction post A comprises a relatively wide platelike portion 10, which forms the post member proper, having a laterally projecting annular flange 11 at the upper end, which is in the form of a heavy disc, having a downwardly offset central portion 12, which is formed with a central depression or recess 13, adapted to accommodate the usual spring centering projection of the top spring plate for the truck spring cluster of the railway car. The post member proper, which depends from the disclike portion 11, is tapered downwardly, as clearly shown in Figure 1, thus presenting flat friction surfaces 14—14 on opposite sides thereof which converge toward each other in downward direction. At the bottom end, the post is provided with laterally, outwardly projecting, heavy flanges 15—15 at the friction surface sides thereof, forming, in effect, a head member presenting upwardly facing, horizontal stop shoulders.

The two friction shoes B and C are identical in design. Referring first to the shoe B, which is illustrated in Figures 5, 6, 7, and 8, the same comprises a base portion 16 and an arm 17 upstanding from said base portion. The base portion 16 comprises a semi-circular plate section 18 and a horizontal web section 19 extending laterally from the lower end of the arm 17 and connecting the latter to the upper side of the plate section 18. The web 19 is substantially in the form of a semi-circular plate section having its diametrical side edge, which is indicated by 20, at right angles to the diametrical side edge 21 of the plate section 18, as clearly shown in Figures 3, 4, 7, and 8. The semi-circular platelike web 19, which overlaps the plate section 18, as shown in the drawings, is of smaller radius than the plate section 18 and presents a curved outer edge face 22, which is concentric with the curved outer edge of the plate section 18. The shoe B is thus broadly of L-shaped form in elevation, the arm 17 forming the vertical portion of the L and the base portion comprising the plate 18 and web 19 forming the horizontal portion of the L. The plate section 18 forms, in effect, a base flange of the shoe B. On the inner side, the arm 17 presents a flat friction surface 23 at the upper end thereof adapted to engage one of the friction surfaces 14 of the post A, and correspondingly inclined to said surface 14. Below the surface 23, the inner side of the post is cut out, as indicated at 24, thereby providing a horizontal shoulder 25 adapted to be engaged by one of the flanges 15 of the post to limit lengthwise separation of the post and shoe. The outer side of the shoe is inclined upwardly and inwardly and the surface of said outer side is transversely curved, said outer side thus presents a conical surface 26. At the bottom end of the arm 17, where it joins the web 19, the surface 26 thereof merges with the outer edge face 22 of the web. As shown most clearly in Figures 6 and 7, the arm 17 extends laterally beyond the diametrical side edge 20 of the web 19, thus presenting at its lower end an overhanging ledgelike portion.

Referring to the friction shoe C, which as hereinbefore stated is identical with the shoe B, the base portion is indicated by 116, the upstanding arm by 117, the semi-circular base plate section by 118, the horizontal web which connects the plate 118 to the arm 117 by 119, the diametrical side edge of the web by 120, the diametrical side edge of the plate section 118 by 121, the curved edge of the web 119 by 122, the friction surface of the arm 117 by 123, the cut out inner side of the arm 117 and the shoulder thereof by 124 and 125, respectively, and the conical outer surface of the arm 117 by 126.

The friction shoes B and C are disposed on opposite sides of the post A with the friction surfaces 23 and 123 thereof engaging the friction surfaces 14 and 14 of the post, the shoe B being disposed at the right hand side and the shoe C at the left hand side of the post, as seen in Figure 1. The bases 16 and 116 of the shoes are intermeshed with the inner edges 21 and 121 of the plate sections 18 and 118 in abutment with each other and the diametrical inner edges 20 and 120 of the webs 19 and 119 also in abutment, as shown in Figures 1, 2, 3, and 4, the plate section 18 of the base 16 being disposed at the left hand side, and the plate section 118 of the base 116 at the right hand side of the mechanism, as seen in Figure 1, the web 19 of the shoe B being engaged over the plate section 118 of the shoe C and underneath the overhanging ledge provided at the bottom end of the friction plate section or arm 117 of the shoe C, and the web 119 of the shoe C being engaged over the plate section 18 of the shoe B and underneath the overhanging ledge provided by the bottom end of the friction plate section or arm 17 of the shoe B. To accommodate the webs 19 and 119 of the shoes and also facilitate assembling of the parts of the mechanism, the arm or plate section of each shoe is cut out at one side, the shoe B being cut out, as indicated at 27, and the shoe C being cut out, as indicated at 127.

At the center of the mechanism, the base portions 16—116 of the two shoes B and C are provided with a seat to accommodate the usual spring centering projection or boss of the follower plate of the truck spring cluster, the plates 18 and 118 being recessed, as indicated at 28, to provide said seat.

The spring resistance D is in the form of a heavy coil surrounding the post and friction shoes and bears at its top and bottom ends, respectively, on the flange 11 of the post A and the flangelike plate members 18 and 118 of the shoes B and C. The spring D is preferably under initial compression and holds the shoes against the friction surfaces of the post, due to the pressure exerted on the base flanges 18 and 118 thereof.

In assembling the parts of my improved friction shock absorber, the shoes B and C are first connected to each other by interengaging the base portions thereof. With the shoes B and C positioned, as shown in Figure 1, the arms 17—17 are spread apart at their upper ends by raising the base portions 16—16 at their outer ends. To hold the shoes in this tilted position, supports in the form of blocks are placed under the base portions 16—116 at diametrically opposite sides of the mechanism remote from the meeting edges of the base portions. The spring D is then placed around the shoes, resting on the base flanges 18—118. The post is then applied by inserting the same downwardly within the coil of the spring D and entering the same between the tilted shoes B and C. As the post is forced downwardly, the spring D is compressed against the base flanges 18—118 of the shoes. The post is forced downwardly until the stop flanges 15—15 thereof are at a level below the shoulders 25—125 of the shoes. The supports for the base portions are then removed, permitting the shoes B and C to swing into engagement with the post A under the pressure of the spring D, thereby bringing the parts to the assembled position shown in Figure 1 with the shoulders 25—125 in overhanging engagement with the stop flanges 15—15 of the post.

The operation of the improved shock absorbing mechanism is as follows: Upon the cluster of springs of the railway car truck being compressed between the spring follower plates of the truck springs, the friction post A and the friction shoes B and C are moved toward each other in lengthwise direction against the resistance of the spring D. Due to the taper of the post, the cooperating ends of the shoes are spread apart and the shoes tilted on the inner ends of their base members against the resistance of the spring D which bears on said base flanges 18—118 of the shoes. High frictional resistance is thus produced between the friction surfaces of the post and shoes, thereby snubbing the action of the truck springs. Compression of the mechanism is positively limited by engagement between the upper ends of the shoes and the offset 12 of the disclike follower of the post. Upon the spring follower plates being moved apart during recoil of the truck springs, the expansive action of the spring D restores all of the parts to the normal release position shown in Figure 1, separation of the post and shoes in lengthwise direction being limited by engagement of the stop flanges 15—15 of the post with the shoulders 25—125 of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction post; of tiltable friction shoes embracing said post at opposite sides, each shoe including an upstanding friction plate section engaging the corresponding side of the post, each friction plate having a base portion projecting laterally therefrom beyond the side of the post opposite to the side engaged by said friction plate, the base portions of said shoes comprising counterpart plate sections of semi-circular shape in edge to edge contact along their diametrical side edges, and counterpart semi-circular web portions respectively connecting said plate sections to said friction plates of the shoes, said web portions being in edge to edge engagement along their diametrical sides, said counterpart plate portions being fulcrumed at their inner ends, said shoes and post being slidable lengthwise with respect to each other; and a coil spring surrounding said post and shoes and opposing relative movement of the post and shoes in lengthwise direction toward each other, said spring bearing on the counterpart semi-circular plate portions of the base portions of said shoes to resist tilting movement of the latter.

2. In a friction shock absorber, the combination with a friction post having a laterally projecting flange at the upper end thereof; of a pair of friction shoes embracing said post at opposite sides, each shoe having an upstanding friction plate section having a friction surface engaging the post, said shoes having counterpart base flanges at the bottom ends of the friction plates thereof the flange of each plate projecting laterally outwardly away from said plate on the friction surface side thereof, and counterpart webs connecting the base flanges and the friction plates of said shoes, said webs being arranged side by side and in contact along their inner edges, each shoe being tiltable about the inner end of its base flange toward and away from said post, said shoes and post being slidable with respect to each other in lengthwise direction; and a coil spring surrounding said shoes and post and bearing at its opposite ends on the flange of said post and the base flanges of the shoes, said spring yieldingly opposing relative longitudinal movement of said post and said shoes toward each other and tilting movement of said shoes away from said post.

3. In a friction shock absorber, the combination with a top follower plate; of a friction post depending centrally from said plate, said post having friction surfaces on opposite sides thereof; friction shoes at opposite sides of the post having lengthwise sliding engagement with the respective friction surfaces of the post, said shoes having laterally extending counterpart base portions at the lower end, the base portion of each shoe extending outwardly beyond the other shoe, the base portion of each shoe including a semi-circular platelike flange section and a semi-circular platelike web section connecting the flange section to the main body portion of the shoe, the platelike flange sections of the shoes being in edge to edge contact on their diametrical side edges, and the diametrical side edges of the webs being disposed side by side in a vertical plane at right angles to the plane of the diametrical side edges of the platelike flange sections; and a spring surrounding said post and shoes and bearing at its top and bottom ends on the follower plate and the flanges of the shoes to oppose relative longitudinal movement of said post and shoes toward each other and tilting movement of said shoes away from the post.

4. In a friction shoe for a friction shock absorbing mechanism, the combination with an upstanding friction plate section having a flat friction surface on the inner side thereof; of a base plate projecting laterally outwardly from the lower end of the inner side of said shoe; and a horizontal web connecting said base plate to the friction plate, said web being disposed to one side of a vertical plane extending laterally through said friction plate and coinciding with the vertical central axis of said plate, said single web being the sole connection between said base plate and friction plate.

5. In a friction shoe for a friction shock absorbing mechanism, the combination with an upstanding friction plate section having a longitudinally extending flat friction surface on the inner side thereof; of a semi-circular base plate having its diametrical edge opposed to the friction surface side of said friction plate section; and a horizontal semi-circular platelike web connecting said semi-circular base plate and friction plate, said semi-circular web having its diametrical side edge extending at right angles to the diametrical side edge of said base plate, said semi-circular base plate and semi-circular platelike web being concentric.

GEORGE E. DATH.

REFERENCES CITED

The following references are of record in the file of this patent:

UNITED STATES PATENTS

| Number | Name | Date |
|---|---|---|
| 709,999 | McCord | Sept. 30, 1902 |
| 767,042 | Denegre | Aug. 9, 1904 |
| 882,279 | Washburn | Mar. 17, 1908 |
| 1,882,801 | Geiger | Oct. 18, 1932 |
| 2,370,028 | Dath | July 10, 1945 |

FOREIGN PATENTS

| Number | Country | Date |
|---|---|---|
| 4,120 | British | Feb. 18, 1914 |